United States Patent [19]

Ogawa et al.

[11] Patent Number: 4,459,617

[45] Date of Patent: Jul. 10, 1984

[54] FACSIMILE RECEPTION APPARATUS

[75] Inventors: Mutsuo Ogawa; Shingo Yamaguchi; Shigeru Katsuragi, all of Tokyo, Japan

[73] Assignee: Ricoh Company, Ltd., Tokyo, Japan

[21] Appl. No.: 532,328

[22] Filed: Sep. 15, 1983

Related U.S. Application Data

[63] Continuation-in-part of Ser. No. 311,222, Oct. 14, 1981, abandoned.

[30] Foreign Application Priority Data

Oct. 20, 1980 [JP] Japan .................................. 55-145732

[51] Int. Cl.³ .............................................. H04N 1/40
[52] U.S. Cl. .................................... 358/280; 358/257; 364/519
[58] Field of Search ........................ 358/280, 256, 257; 364/519

[56] References Cited

U.S. PATENT DOCUMENTS 4,165,520  8/1979  Wessler ................................ 358/280
4,297,727  10/1981  Ogawa ................................ 358/261

Primary Examiner—Howard W. Britton
Attorney, Agent, or Firm—David G. Alexander

[57] ABSTRACT

A facsimile reception apparatus of a facsimile transceiver processes video data using a microcomputer. When one line of decoded video data are stored in a random access memory of the microcomputer, the video data are transferred to a printing section through a microprocessor a plurality of bits at a time. The printing section reproduces a plurality of bits of input video data and then delivers an interruption signal to the microprocessor to request transfer of another plurality of bits of video data thereto. One line of video data are divided into N segments each consisting of the predetermined number of bits. After transfer of the Nth video data segment, an interruption by the printing section which will result from full printing of said video data is inhibited.

7 Claims, 4 Drawing Figures

FACSIMILE RECEPTION APPARATUS

CROSS REFERENCE TO RELATED APPLICATION

This application is a continuation in part of copending U.S. patent application Ser. No. 311,222, filed Oct. 14, 1981, now abandoned.

BACKGROUND OF THE INVENTION

The present invention generally relates to facsimile reception apparatuses of facsimile transceivers and, more particularly, to a facsimile data processing system for a facsimile reception apparatus which is desirable for the transfer of decoded video data to a printing section during reception of facsimile data.

In a facsimile reception apparatus of a facsimile transceiver, coded data transmitted from a remote transmitter are usually decoded by a decoder into original one line of video data. The decoded one line of data are transferred to a printing section to be reproduced thereby on a recording medium. Under ordinary conditions, the rate of printing one line of data at the printer is not identical with the rate of decoding one line of data at the decoder. An expedient hitherto known for coordinating such different processing rates at the decoder and printer consists in interposing a buffer memory between the decoder and the printer.

In a prior art facsimile receiver with such an expedient, coded data arrived thereat from a remote transmitter are passed to a decoder through a modem and a communication control. The decoder of such a receiver generally comprises a shift register, a run-length code conversion table, a run-length counter, a line buffer and a clock pulse generator.

As the shift register of the decoder is filled with one run-length code, the code is transformed by the run-length conversion table into a corresponding numerical run-length value. This numerical value is loaded in the run-length counter whereupon the clock pulse generator is triggered to produce clock pulses. The run-length counter is progressively decremented by the clock pulses while the line buffer is sequentially supplied with logical "1" or "0" indicative of "black" or "white" also in response to the clock pulses. Upon the decrement of the counter to zero, the clock pulse generator is deactivated. Such a procedure is repeated in sequence for each run-length until the decoder decodes all the one-line data. One line of video data thus stored in the line buffer are transferred to the buffer memory which is connected between the decoder and a printing section of the receiver. Simultaneously, previous one line of video data are fed from the buffer memory to the printing section to be reproduced thereby on a sheet of paper.

The buffer memory between the decoder and the printer as well as the line buffer in the decoder is indispensable in the prior art facsimile receiver. This makes the construction complex and costly and, additionally, requires a disproportionate period of time for the data transfer which eventually slows down the processing received data.

Tremendous progress has been made recently in the rationalization of facsimile transceivers utilizing microcomputers to implement heretofore discrete functions under program and interrupt control. An example of such a system is disclosed in commonly assigned U.S. Pat. No. 4,297,727, issued Oct. 27, 1981 which is incorporated herein by reference. More specifically, the various functions of inputting received data, decoding the received data, transferring the decoded data to a printing section and control of the printing operation are performed by a microcomputer. The various operations are performed by subroutines on a time sharing basis under the control of a priority interrupt system.

As will become clear from the following description, operations including the inputting of received data (A), decoding the data (B), transferring the decoded data to a printing section (C) and performing line feed of the printing apparatus and the actual printing operation (D) are conventional and known per se. These operations may be performed by a microcomputer under program and interrupt control as disclosed in detail in the above discussed U.S. patent. The details of these operations do not constitute the subject matter of the present invention and may be performed in any suitable manner such as described in the patent.

The present invention constitutes a novel and unobvious improvement over the Assignee's previous system as disclosed in the patent relating to the manner in which the overall interrupt control is performed. In the prior patent, the interrupt control involves the management of four duties, F, G, I and H. Duty I, which is normally performed, is the decoding of received data including transfer from a FIFO area to an RBF area of a random access memory RAM. Duty F involves the setting and resetting of memory full and data read flags. Duty G comprises the receiving and storing of data in the FIFO area of the RAM. Duty H involves the reading out of the decoded data from the RBF area of the RAM and the printing of the data. The priority interrupt system is such that $F>G>H>I$.

The present invention improves over the prior patent in the rationalization of the priority interrupt system by management of the subroutines (A), (B), (C) and (D) discussed above rather than the duties F, G, H and I. The unexpected benefits of such rationalization will become clear from the following detailed description.

SUMMARY OF THE INVENTION

It is an object of the present invention to provide a facsimile reception apparatus of a facsimile transceiver which has an uninterrupted or direct video data transfer path from a decoder to a printer without the intermediary of a buffer memory to be simple and economical in construction and quicken the video data transfer from the decoder to the printer.

In order to achieve this object, a facsimile reception apparatus embodying the present invention employs a microcomputer for processing input video data. When one line of decoded video data are stored in a random access memory of the microcomputer, the video data are transferred via a microprocessor to a printing section a plurality of bits at a time. In the printing section, each plural bits of the video data are printed whereupon an interruption signal is fed to the microprocessor to request another transfer of video data thereto.

It is another object of the present invention to provide increased operational speed together with system simplification through the embodiment of rationalized priority interrupt management.

It is another object of the present invention to provide a generally improved facsimile reception apparatus.

Other objects, together with the foregoing, are attained in the embodiment described in the following description and illustrated in the accompanying drawings.

DESCRIPTION OF THE PREFERRED EMBODIMENT

While the facsimile reception apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
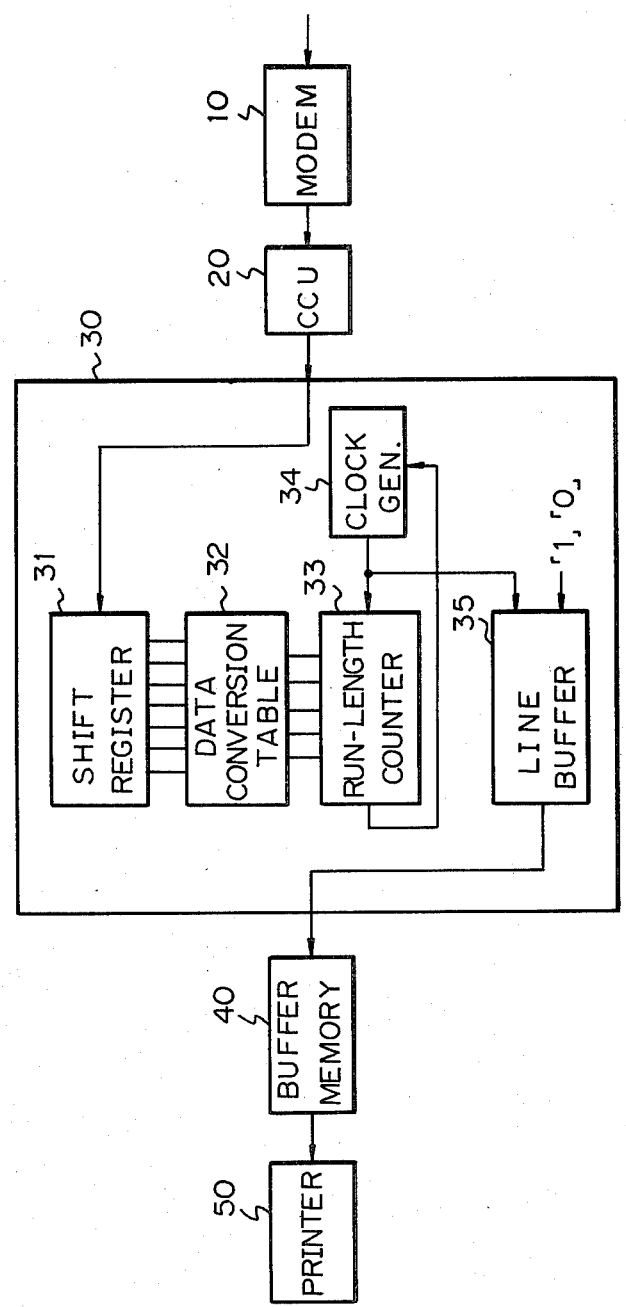
FIG. 1 is a block diagram showing a prior art facsimile reception apparatus of a facsimile transceiver.

To facilitate better understanding of the present invention, brief reference will be made to a prior art facsimile reception apparatus illustrated in FIG. 1. The facsimile reception apparatus generally comprises a modem 10, a communication control 20, a decoder 30, a buffer memory 40 and a printer 50. Coded data delivered from a remote facsimile transmitter to the receiver is demodulated by the model 10 and coupled to the decoder 30 via the communication control 20.

The decoder 30 is comprised of a shift register 31, a conversion table 32, a run-length counter 33, a clock pulse generator 34 and a line buffer 35. As one run-length code is loaded in the shift register 31, it is transformed into a corresponding numerical run-length value by the conversion table 32. When this numerical value is transferred to the run-length counter 33, the clock pulse generator 34 is driven to supply the run-length counter 33 and line buffer 35 with clock pulses. Then, the run-length counter 33 is progressively decremented while the line buffer 35 is sequentially supplied with logical "1" or "0" indicative of "black" or "white" video data, respectively. Upon the decrement of the counter 33 to zero, the clock pulse generator 34 is deactivated.

This procedure is repeated sequentially for each run-length to decode the coded input data. When one full line of decoded video data are stored in the line buffer 35, they are transferred from the decoder 30 to the buffer memory 40. Simultaneously, previous one line of video data are transferred from the buffer memory 40 to the printer 50 to be printed out thereby on a sheet of paper.

However, the line buffer 35 in the decoder 30 and the buffer memory 30 between the decoder 30 and the printer 50 make the entire construction intricate and costly. Also, they add to a time period necessary for the data transfer and thereby slow down the data processing during data reception.

The present invention is elaborated to simplify the construction of a facsimile receiver, cut down the cost thereof and speed up a transfer of video data to a printer by employing an uninterrupted video data transfer path from the decoder to the printer without the intermediary of a buffer memory.

Figure 2:
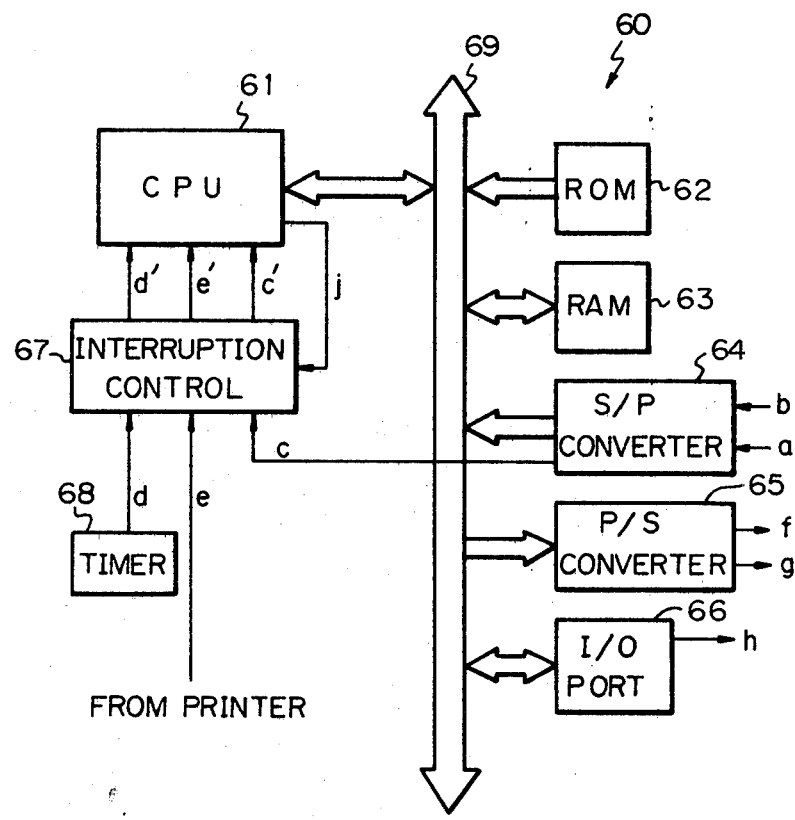
FIG. 2 is a block diagram showing a facsimile reception apparatus embodying the present invention.

Referring to FIG. 2 of the drawings, the facsimile reception apparatus in accordance with the present invention includes a data processing network generally designated by the reference numeral 60. This network 60 comprises a central processing unit or CPU 61, a read-only memory or ROM 62, a random access memory or RAM 63, a serial-to-parallel converter 64 for transforming a serial input into a parallel output, and a parallel-to-serial converter 65 operating in the opposite manner to the serial-to-parallel converter 64. The network 60 also comprises an input/output or I/O port 66, an interruption control 67, a timer 68 and a system bus 69.

The state of the art in computer technology is extremely high, and the various component parts of the microcomputer system may be embodied by a great variety of known integrated units which are commercially available as off-the-shelf items. The actual embodiment of system itself once the novel concepts have been taught and understood through the disclosure is generally an exercise in product selection. Typical part numbers for the main operational units of the present microcomputer system are listed in the table below, but are not to be considered in any way restrictive of the scope or spirit of the present invention, and are provided for illustrative purposes only.

CPU 61-Intel 8085
ROM 62-Intel 8316
RAM-63-Intel 8101A4
S/P converter 64-TI 74LS164, TI 74LS161
P/S converter 65-TI 74LS166, Ti 74LS161
I/O interface 66-Intel 8212
Interruption control-Intel 8214

In this embodiment, use is made of an 8-bit microcomputer for illustrative purpose. Parallel data will therefore appear on the system bus 69 eight bits at a time and be transferred to the various sections. In this connection, the serial-to-parallel converter 64 is furnished with a shift register. The modem supplies the shift register with received data b bit by bit in synchronism with clock pulses a. As the data sequentially stored in the shift register reaches eight bits, a serial-to-parallel ready signal c is delivered from the serial-to-parallel converter 64. The signal c is coupled through the interruption control 67 to the CPU 61 as a serial-to-parallel interruption signal.

The CPU 61 practices various routines based on a control program stored in the ROM 62. In response to a serial-to-parallel ready signal c mentioned above, the CPU 61 immediately reads eight bits of data in parallel out of the serial-to-parallel converter 64 and store them in a predetermined area of the RAM 63. This is represented by a received data interruption routine A in FIG. 4.

Usually, the CPU 61 reads data thus stored in the predetermined area of the RAM 63 eight bits at a time and decodes them with reference to a conversion table stored in the ROM 62. The decoded video data are stored in another preselected area of the RAM 63 (line buffer area) eight bits at a time. This is a video data decoding routine B in FIG. 4.

Figure 4:
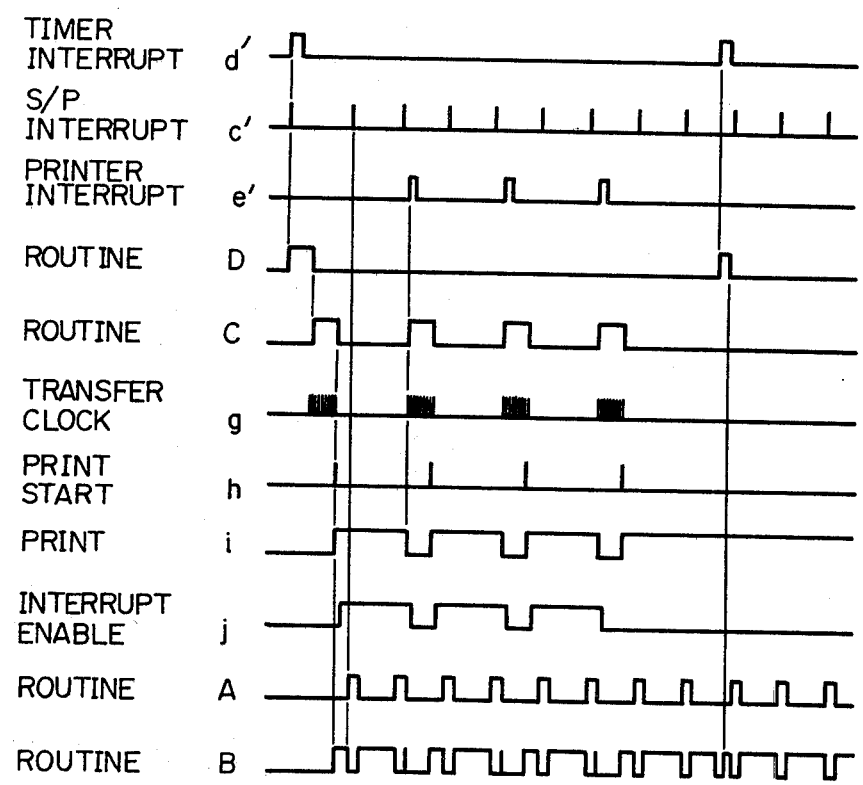
FIG. 4 is a timing chart demonstrating an operation of the facsimile receiver shown in FIGS. 2 and 3.

Furthermore, as one line of decoded video data are fully stored in the RAM 63, the CPU 61 performs a video data transfer routine C in FIG. 4. This routine C is initiated by a timer interruption signal d' which appears from the interruption control 67 in response to a periodically occurring signal d from the timer 68. Thereafter, the routine C proceeds in response to printer interruption signals e' which the interruption control 67 produces in response to end of record signals e, which will appear from the printing section 70 as will be described.

During the routine C, one line of data stored in the RAM 63 are read by the CPU 61 eight bits at a time and coupled to the parallel-to-serial converter 65 in sequence. Video data f thus converted into a serial format by the converter 65 are supplied to the printing section 70 in synchronism with clock pulses g.

Figure 3:
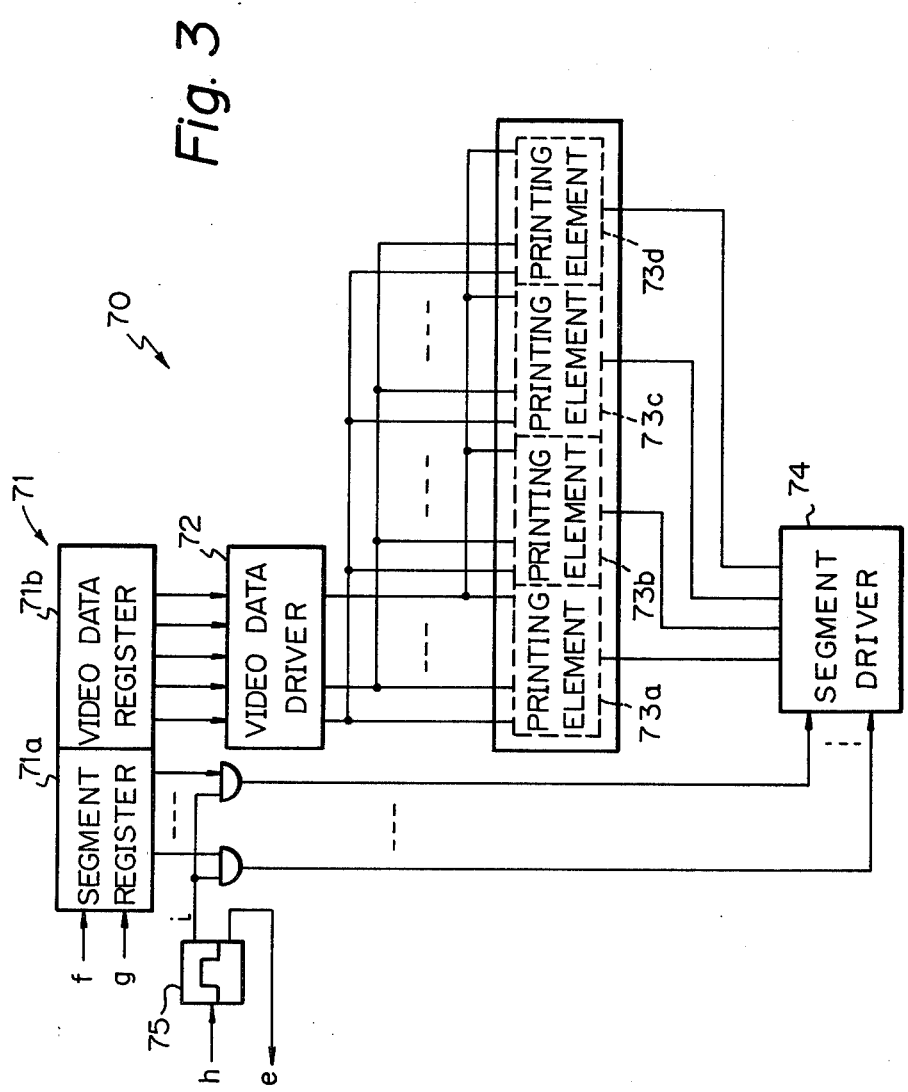
FIG. 3 is a block diagram representing a printing section included in the facsimile receiver of FIG. 2.

An illustrative arrangement of the printing section 70 is indicated in FIG. 3. As shown, the printing section 70 comprises a shift register 71, a video data driver 72, a thermal head 73, a segment driver 74 and a one-shot multivibrator having a variable output time.

The thermal head 73 has one line of thermal recording elements 73a, 73b, 73c and 74d arranged thereon. These thermal recording elements 73a–73d are divided into N segments each having M bytes each of which consists of eight bits. Data will thus be recorded M bytes at a time.

Thus, the shift register 71 is made up of a 1-byte segment register 71a and an M-byte video data register 71b. During the video data transfer routine C, M bytes of video data are transferred from the RAM 63 to the parallel-to-serial converter 65 with segment data indicative of a specific segment added to the trailing end of the M-byte video data. These data f are supplied from the parallel-to-serial converter 65 to the shift register 71 in synchronism with clock pulses g.

At the end of the transfer routine C, a print start signal h is fed from the I/O port 66 to the one-shot multivibrator 75. In response to this signal h, the one-shot multivibrator 75 produces a print signal i having a given duration so that the segment driver 74 is driven in accordance with the data stored in the segment register 71a. The video data driver 72 on the other hand is driven in accordance with the video data stored in the video data register 71b. Then, the segment driver 74 and video data driver 72 energize printing elements of the selected segment on the thermal head 73, thereby reproducing an image on a heat-sensitive paper sheet.

The duration of the print signal i from the one-shot multivibrator 75 is dependent on the temperature of the thermal head 73. When the print signal i disappears, that is, when the printing operation is completed, the one-shot multivibrator 75 supplies the interruption control 67 shown in FIG. 2 with an end of print signal e.

In operation, the timer 68 produces timer signals d at a period corresponding to the minimum transmission time of one line of data. In response to a timer signal d, the interruption control 67 feeds a timer interruption signal d' to the CPU 61 as seen in FIG. 4. Then the CPU 61 practices a routine D including feeding a vertical scan motor on the basis of the program stored in the ROM 62.

After this routine D, the CPU 61 performs a video data transfer routine C in which M bytes of video data from the RAM 63 are transferred to the printer 70 via the parallel-to-serial converter in synchronism with clock pulses g. At the end of this routine C, a print start signal h is supplied from the I/O port 66 to the printer 70.

In the course of these routines C and D, the CPU 61 does not accept any other interruption signal. Once such routines C and D are completed, the CPU 61 feeds an interruption enable signal j to the interruption control 67.

Meanwhile, the printer 70 print data based on the input M bytes of video data f coupled thereto from the parallel-to-serial converter 64 by driving recording elements of a selected segment for the duration of the print signal i. During this time period, the CPU 61 performs a video data decoding routine B after the routines C and D.

The serial-to-parallel converter 64 supplies the interruption control 67 with serial-to-parallel ready signals c at constant intervals. When the CPU receives a serial-to-parallel interruption signal c' from the interruption control 67 while practicing the routine B, it interrupts the routine B and, instead, performs a routine A for storing eight bits of received data in the RAM 63. After this routine A, the CPU 61 goes back to the decoding routine B. This is repeated thereafter.

The printer 70 delivers an end of print signal e to the interruption control 67 when it fully records the M-byte input data. In response to this signal e, the interruption control 67 produces a printer interruption signal e' which causes the CPU 61 to carry out a second video data transfer routine C.

The above procedure is repeated thereafter until one full line of video data are processed. After the transfer of the final M bytes of video data to the printer, the CPU 61 does not accept an interruption request which will occur in response to an end of print signal concerned with said M bytes of data. Instead, the CPU 61 performs a second routine D accepting the next timer interruption signal d'.

At this instant, if one line of decoded video data is absent in the RAM 63, the CPU 61 does not produce any vertical feed command while performing the other processings only. After this routine D, the CPU 61 goes to a decoding routine B. The CPU 61 carries out the received data interruption routine A as required during the routine B until one line of video data are fully reproduced.

Thus, in accordance with this embodiment, an interruption signal is fed to the CPU 61 upon completion of a recording operation at the printer 70 so that one line of decoded video data may be transferred from the RAM 63 M bytes at a time. This permits decoded video data to be transferred to the printer 70 at a rate matching with the recording rate, unnecessitating intermediary of a buffer memory between the decoder and the printer.

An M-byte data transfer routine C is caused not by a timed interruption from a timer but by an end of print signal e. Accordingly, the printing time period at the printer can be varied with the temperature at the thermal head 73 without resulting any stand-by time of the CPU 61. This establishes continuity among the various routines which promotes efficient operations of the CPU 61. Additionally, the variable printing time affords images of even density.

To summarize the novel priority interrupt management of the present invention, the apparatus executes the routine D in which the operations associated with line feed and the like are performed. Following this, the routine C is executed in which a block of data is transferred from the RAM to the CPU for printing. The printer generates the printer interrupt signal e' when the printing operation is completed which unconditionally causes transfer of another block of data from the RAM to the printer.

Two other main operations are performed by the apparatus. The first of these is the reception of input data via the modem, storage of the same in a shift register of the S/P converter 64 and transfer of the in the form of an 8-bit byte to the RAM. Upon S/P conversion of an input byte, the converter 64 generates the signal c resulting in the interrupt signal c'. If the routine C or D is not being performed, the signal c' will result in the execution of the routine A in which the byte of data will be fed from the converter 64 to the RAM. However, the interrupt enable signal j is logically low during execution of the routines C and D, thereby masking the signal c' and inhibiting the routine A.

The other operation is decoding of the input data in the RAM. This operation is performed continuously except during the routines C, D and A. More specifically, the interrupt enable signal j inhibits the decoding operation and the decoding operation is interrupted by the signal c'.

It will be understood that four operations, line feed (D), transfer for printing (C), decoding (B) and data input (A) are performed in a unique manner utilizing a novel interrupt system. Although these operations are old and well known per se, the manner in which they are performed in accordance with the present invention is heretofore unknown and provides a major technical advantage over the prior art.

In summary, it will be seen that the present invention provides a facsimile reception apparatus which is simple and economical in construction due to omission of a buffer memory otherwise interposed between a decoder and a printer, speeds up a data transfer, increases the operating rate of a central processing unit, and reproduces images of an excellent quality.

Various modifications will become possible for those skilled in the art after receiving the teachings of the present disclosure without departing from the scope thereof.

What is claimed is:
1. A facsimile reception apparatus comprising:
   modem means;
   a random access memory for storing input video data from the modem means;
   a central processing unit or a microprocessor for decoding the video data stored in the random access memory;
   a read only memory containing an operating program;
   timer means for periodically producing a timer signal;
   printing means for printing a predetermined plurality of bits of video data and producing a print end signal after the video data are printed; and
   interruption control means for producing a timer interruption signal and a printer interruption signal in response to the timer signal and the print end signal, respectively;
   said microprocessor being constructed to transfer the predetermined plurality of bits of video data at a time to the printing means in response to the timer interruption signal when at least one line of video data decoded by the microprocessor are stored in the random access memory and further constructed to transfer another plurality of bits of video data at a time in response to the printer interruption signal.

2. A facsimile reception apparatus as claimed in claim 1, in which said one line of video data are divided into a predetermined number of segments each consisting of said predetermined plurality of bits of video data, said microprocessor being further constructed to inhibit the printer interruption signal after transfer of the last video data segment.

3. A facsimile reception apparatus as claimed in claim 2, in which said microprocessor is further constructed to initially transfer the first video data segment to the printing means in response to the timer interruption signal and to transfer the second video data segment to the last video data segment to the printing means in response to the printer interruption signal.

4. A facsimile reception apparatus as claimed in claim 1, further comprising a serial-to-parallel converter for converting serial input video data into parallel output video data, the serial-to-parallel converter comprising a shift register and being constructed to produce a serial-to-parallel ready signal when a predetermined number of bits of input video data from the modem means is stored in the shift register.

5. A facsimile reception apparatus as claimed in claim 4, in which the interruption control means further produces a serial-to-parallel interruption signal in response to the serial-to-parallel ready signal, the microprocessor being further constructed to read the video data stored in the shift register of the serial-to-parallel converter and to store the read data in a predetermined area of the random access memory.

6. A facsimile reception apparatus as claimed in claim 5, in which the microprocessor is further constructed to read the data stored in the predetermined area of the random access memory, decode the read data in accordance with a conversion table in the operating program of the read only memory, and store the decoded data in another predetermined area of the random access memory.

7. A facsimile reception apparatus as claimed in claim 6, further comprising a parallel-to-serial converter for converting parallel decoded data stored in said another predetermined area of the random access memory to serial decoded data to transfer the converted parallel decoded data to the printing means.

* * * * *